United States Patent [19]
Thigpen, Jr.

[11] 3,796,264
[45] Mar. 12, 1974

[54] PERMEABILITY IMPROVEMENT TECHNIQUE
[75] Inventor: Arnold B. Thigpen, Jr., Houston, Tex.
[73] Assignee: Texaco Inc., New York, N.Y.
[22] Filed: Apr. 26, 1972
[21] Appl. No.: 247,546

[52] U.S. Cl............................. 166/302, 166/305 R
[51] Int. Cl.......................................... E21b 43/24
[58] Field of Search......................... 166/302, 305 R

[56] References Cited
UNITED STATES PATENTS
3,603,396  9/1971  Braun............................. 166/305 R
3,358,763  12/1967  Petty et al........................... 166/302

OTHER PUBLICATIONS
Slobod, "Restoring Permeability to Water-Damaged Pars," 2/70, pp. 104–108.

Smith et al., "Potassium, Calcium Treatments Inhibit Clay Swelling," 11/64, pp. 80 and 81.

Davis, "The Swelling of Bentonite and its Control," 12/27, pp. 1,350–1,352.

Primary Examiner—Henry C. Sutherland
Assistant Examiner—Jack E. Ebel

[57] ABSTRACT

A water sensitive subterranean fluid reservoir, a petroleum reservoir, for example, previously damaged by swelling due to contact with water is improved in permeability by treating the reservoir with potassium chloride at about 100° C. for several hours.

10 Claims, No Drawings

PERMEABILITY IMPROVEMENT TECHNIQUE

BACKGROUND OF THE INVENTION

This invention concerns the field of treating damaged subterranean formations to restore permeability.

Subterranean formations containing fluids often consist of interconnected pores through which the fluids in the formations may flow if a sufficient force in the form of a pressure drop, for example, is applied. The fluids in a particular formation may be aqueous, hydrocarbon or both.

The rock or mineral of which the formation is composed often has water sensitive clays as a constituent. The water sensitive clays, montmorillonite being the most common, will often swell when contacted with water which is not indigenous to the formation. This swelled clay will block the interconnected pores in the formation and cause a reduction in the permeability of the formation to fluids. This permeability reduction is the damage referred to hereinafter.

Prior art techniques have been used to change the character of the swelling clays to non-swelling varieties. For example, U. S. Pat. No. 3,543,858 (1970) describes a method whereby an aqueous solution of potassium chloride is injected into a subterranean formation and the formation is then heated to 260° C. (500° F.) for a week. This procedure changes the clays in the formation from a swelling type, montmorillonite, to a non-swelling type, illite. Although this procedure is theoretically valid the practical problems of heating any significant portion of a subterranean reservoir to 500° F. for a week are enormous.

Another method of preventing clay swelling or restoring the permeability of a damaged formation is found in U. S. Pat. No. 3,237,692 (1966) and includes injecting steam at a temperature of 185° C. or above and a soluble alkali metal salt into the damaged formation for an indefinite period. Once again the high temperature and time requirements pose practical problems to the operability of this process.

My invention describes a method which will restore permeability to a damaged formation at a much lower temperature and shorter treatment time than the prior art indicates is necessary.

SUMMARY OF THE INVENTION

The invention is a method of improving permeability in a subterranean fluid containing reservoir composed partially of clay subject to swelling and containing interconnected pores which reservoir has previously been damaged by water causing the clay in the reservoir matrix to swell, thus reducing the permeability of the reservoir to fluid flow, comprising contacting the reservoir with a solution of potassium chloride and heating the contacted portion of the reservoir to about 100° C. for a short period of time.

DESCRIPTION OF THE PREFERRED EMBODIMENTS

Generally, the process of my invention is carried out by contacting a fluid filled formation containing clay swelled by water with an aqueous solution of potassium chloride. The formation is then heated by conventional means such as hot gases and heaters in the well bore to a temperature of from about 80° to 110° C. It is preferred to operate at as low a temperature as possible while still realizing the permeability improvement. The formation need be held in this temperature range for only a short period of time. About 6 hours is the minimum time needed to effect an improvement. Longer heating periods such as a day may be required in some cases but are not generally preferred or required. It is preferred to heat the reservoir for a period of from 6 to 8 hours. The extremely high temperatures for long periods such as suggested by the prior art are not within the scope of my invention. The concentration of potassium chloride in the aqueous solution used to contact the reservoir should range from about 0.5 weight percent to about 10 weight percent. It is preferred to use from about one percent to about three percent.

The method of my invention may be applied, for example, to petroleum containing reservoirs which are being flooded with an aqueous fluid to drive the petroleum, usually oil, to production wells where it is produced. In this method of oil production there are usually at least two wells. One well called the production well is in fluid communication with the oil in the reservoir and another well called the injection well is in fluid communication with oil or water in the reservoir some distance away. Water injected into the injection well provides energy whereby oil is driven to the production well where it is produced. Since the injected water is foreign to the reservoir there is a possibility that clay swelling may occur. Swelling will more likely happen if the injected water is fresh water. The resultant loss of permeability will cause injection to be difficult and probably reduced unless inordinate pressure is applied. Using the process of my invention, an aqueous solution of potassium chloride may be injected into the reservoir through the injection well, and then the formation may be heated to the desired temperature for a sufficient time as discussed before. Thereafter, injection of water may be resumed as before with an increase in permeability. This procedure may be repeated as necessary to maintain adequate permeability.

The method of my invention can also improve the permeability of reservoir sections around and oil production well. Fresh water contact can occur during many of the drilling and completion operations and swell clays in these oil reservoirs around well bores. The resultant loss in permeability around the well bore may cause poor producing capability. An aqueous solution of potassium chloride may be injected into such an oil producing well to a distance from the well bore approximating the damaged area. Heat is applied for the required time and oil production resumed.

There are numerous specific situations where the method of my invention would apply. The above illustrations are not intended to be exhaustive.

EXPERIMENTAL

The examples which follow are experiments which establish the feasibility of my invention. Cores taken from a water-sensitive formation (one which contained a clay which will swell on contact with fresh water). X-ray analysis of these cores showed the presence of 15 to 18 percent montmorillonite (a clay which swells in the presence of fresh water). Prior to testing, these cores were extracted free of oil and dried at 100° C.

EXAMPLE 1

A core as described above was subjected to the procedure depicted in the table below. The core was water flooded with 100 pore volumes of fresh water. The permeability decline is recorded. The fresh water was then flooded through the core in the opposite direction for 25 pore volumes. Next a two percent solution of potassium chloride was flooded through the core for 50 pore volumes. Next the flow of the potassium chloride solution was reversed for 25 pore volumes. At this point the core was saturated with potassium chloride solution and the core was heated for 24 hours at 110° C. and 0.25 mm pressure. The core was then flooded with 100 pore volumes of fresh water and the flow was reversed for another 100 pore volumes. After the heat treatment, a marked improvement in permeability was realized (0.15 md to 0.65 md).

PERMEABILITIES, MD.

| Pore volumes | Water flood | Flow reversed | 2% potassium chloride flood | Flow reversed | Heat treatment | 2% potassium flood following treatment | Flow reversed |
|---|---|---|---|---|---|---|---|
| 10 | 0.35 | 0.12 | 0.13 | 0.14 | | 0.65 | 0.30 |
| 25 | 0.28 | 0.11 | 0.15 | 0.15 | | 0.53 | 0.27 |
| 50 | 0.19 | | 0.16 | | | 0.41 | 0.24 |
| 100 | 0.11 | | | | | 0.34 | 0.17 |

EXAMPLE 2

A similar experiment to the one described above was performed and the results are depicted below. Note as in Example 1 only after the heating portion of the experiment was a significant restoration of permeability realized.

PERMEABILITIES, MD.

| Pore volumes | Water flood | Flow reversed | 2% potassium chloride flood | *Heat treatment | 2% potassium flood following treatment | Flow reversed |
|---|---|---|---|---|---|---|
| 10 | 0.83 | 0.31 | 0.24 | | 0.37 | 0.33 |
| 25 | 0.63 | 0.24 | 0.28 | | 0.34 | 0.30 |
| 50 | 0.51 | 0.19 | 0.28 | | 0.33 | 0.29 |
| 100 | 0.40 | | | | 0.33 | |

*The core saturated with two percent potassium chloride was heated at 80° C. for 6 hours at 76 pounds per square inch.

EXAMPLE 3

Another core was subjected to the method of my invention and the results are tabulated below.

| Pore volumes | Water flood | Flow reversed | 2% potassium chloride flood | Flow reversed | *Heat treatment | 2% potassium flood following treatment | Flow reversed |
|---|---|---|---|---|---|---|---|
| 10 | 1.04 | 0.33 | 0.29 | 0.36 | | 0.56 | |
| 25 | 0.85 | 0.32 | 0.36 | 0.37 | | 0.59 | 0.67 |
| 50 | 0.68 | 0.25 | 0.38 | | | 0.63 | 0.51 |
| 100 | 0.50 | 0.21 | 0.39 | | | 0.69 | |

*Treatment consisted of (1) a nitrogen sweep to dry the liquid phase from the core followed by (2) heating, without nitrogen flow, for 6 hours at 175° F. (80° C.).

I claim:

1. A method of improving permeability in a subterranean fluid containing reservoir composed partially of clay subject to swelling said reservoir containing interconnected pores and wherein said reservoir having been previously damaged by contact with water causing the clay in the reservoir matrix to swell thereby reducing the permeability of the reservoir to fluid flow comprising, contacting the reservoir with a solution of potassium chloride and heating the contacted portion of the reservoir to a temperature of about 80° to 120° C. for a period of up to a day.

2. A method as in claim 1 wherein the potassium chloride is present in the solution contacting the reservoir in an amount from about 0.5 weight percent to about 10 weight percent.

3. The method of claim 2 wherein the concentration of potassium chloride is from about 1 weight percent to about 3 weight percent.

4. A method of claim 1 wherein the time of heating is about 6 to 8 hours.

5. A method as in claim 1 wherein the reservoir is heated to a temperature of about 80° C. to about 100° C.

6. A method of improving permeability in a subterranean fluid containing reservoir composed partially of clay subject to swelling said reservoir containing interconnected pores and wherein said reservoir having been previously damaged by contact with water causing the clay in the reservoir matrix to swell thereby reducing the permeability of the reservoir to fluid flow comprising, contacting the reservoir with a solution of potassium chloride, passing a gas through the portion of the reservoir so contacted to remove a portion of the water and heating the portion of the reservoir originally contacted with the potassium chloride solution to a temperature of about 80° to 120° C.

7. A method as in claim 6 wherein the potassium chloride is present in the solution originally contacting the reservoir in an amount from about 0.5 weight percent to about 10 weight percent.

8. The method of claim 7 wherein the concentration of potassium chloride is from about 1 weight percent to about 3 weight percent.

9. A method as in claim 6 wherein the time of heating is about 6 to 8 hours.

10. A method as in claim 6 wherein the reservoir is heated to a temperature of about 80° C. to about 100° C.

* * * * *